(12) United States Patent
Li et al.

(10) Patent No.: US 9,342,749 B2
(45) Date of Patent: May 17, 2016

(54) HARDWARE CONVOLUTION PRE-FILTER TO ACCELERATE OBJECT DETECTION

(71) Applicant: Intel Corporation, Santa Clara, CA (US)

(72) Inventors: Jianguo Li, Beijing (CN); Ya-Ti Peng, Sunnyvale, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 13/977,061

(22) PCT Filed: Dec. 18, 2012

(86) PCT No.: PCT/CN2012/086840
§ 371 (c)(1),
(2) Date: Jun. 28, 2013

(87) PCT Pub. No.: WO2014/094232
PCT Pub. Date: Jun. 26, 2014

(65) Prior Publication Data
US 2015/0146915 A1 May 28, 2015

(51) Int. Cl.
*G06K 9/46* (2006.01)
*G06K 9/00* (2006.01)
*G06K 9/62* (2006.01)
*G06T 7/00* (2006.01)

(52) U.S. Cl.
CPC .......... *G06K 9/4609* (2013.01); *G06K 9/00986* (2013.01); *G06K 9/6257* (2013.01); *G06K 9/6286* (2013.01); *G06T 7/0081* (2013.01); *G06T 2207/20024* (2013.01); *G06T 2207/20148* (2013.01)

(58) Field of Classification Search
CPC .............. G06K 9/6286; G06K 9/4609; G06K 9/00986; G06T 7/0081
USPC ...................................................... 382/103
See application file for complete search history.

(56) References Cited

U.S. PATENT DOCUMENTS

| 4,330,833 | A | 5/1982 | Pratt et al. | |
| 7,426,310 | B1 * | 9/2008 | Barrett | 382/248 |
| 8,170,282 | B1 * | 5/2012 | Roskovensky | 382/103 |
| 8,594,375 | B1 * | 11/2013 | Padwick | 382/103 |

(Continued)

OTHER PUBLICATIONS

SURF: Speeded Up Robust Features. Herbert Bay, Tinne Tuytelaars, and Luc Van Gool. 2006.*

(Continued)

*Primary Examiner* — Stephen R Koziol
*Assistant Examiner* — Delomia L Gilliard
(74) *Attorney, Agent, or Firm* — Green, Howard & Mughal LLP

(57) ABSTRACT

Systems, apparatus, articles, and methods are described related to a hardware-based convolution pre-filter to accelerate object detection.

19 Claims, 8 Drawing Sheets

(56) References Cited

U.S. PATENT DOCUMENTS

| | | | |
|---|---|---|---|
| 2007/0133840 A1* | 6/2007 | Cilia | 382/103 |
| 2007/0292047 A1* | 12/2007 | Jiao et al. | 382/279 |
| 2010/0092036 A1* | 4/2010 | Das | G06K 9/3241 |
| | | | 382/103 |
| 2010/0205124 A1* | 8/2010 | Ben-Hur et al. | 706/12 |
| 2010/0239170 A1* | 9/2010 | Asnis | 382/190 |
| 2011/0110560 A1* | 5/2011 | Adhikari | 382/103 |
| 2012/0076408 A1* | 3/2012 | Suk et al. | 382/173 |
| 2013/0243329 A1* | 9/2013 | Oro Garcia et al. | 382/195 |
| 2013/0279750 A1* | 10/2013 | Zhou et al. | 382/103 |
| 2014/0028861 A1* | 1/2014 | Holz | 348/208.4 |

OTHER PUBLICATIONS

Machine Vision: Chapter 4: Image Filtering. pp. 112-139. R. Jain, K. Rangachar, B. Schunck. 1995.*

International Search Report and Written Opinion received for PCT Patent Application No. PCT/CN2012/086840, mailed on Sep. 26, 2013, 10 pages.

* cited by examiner

HARDWARE CONVOLUTION PRE-FILTER TO ACCELERATE OBJECT DETECTION

BACKGROUND

Object detection has a wide range of applications. For example, face detection may be used in human-computer interaction, photo-album management, biometric authentication, video surveillance, automatic-focus imaging, and a variety of other vision systems. Human detection may be used in video surveillance, advanced driver assistance systems, and the like. Other object detection examples include traffic monitoring, automated vehicle parking, character recognition, manufacturing quality control, object counting and quality monitoring.

In some existing object detection systems, the Viola-Jones cascade detection framework is used. In the Viola-Jones cascade detection framework, an input image is scanned with a sliding window to probe whether or not a target exists in the window using a cascade classifier. Such methods are computationally intensive. Software and hardware based implementations have been proposed, however there are limitations to the existing implementations especially as image and video resolution increase. In software implementations, it may be impossible to realize real-time object detection. In graphics processing unit (GPU) implementations, such methods may consume most or all of the computing resources such that resources are not available for other tasks. Other hardware implementations, such as field-programmable gate array (FPGA) and digital signal processor (DSP) implementations may not be re-configurable when the hardware is fixed.

Since object detection may be used in such a wide variety of applications, it may be desirable to make object detection execute more efficiently.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
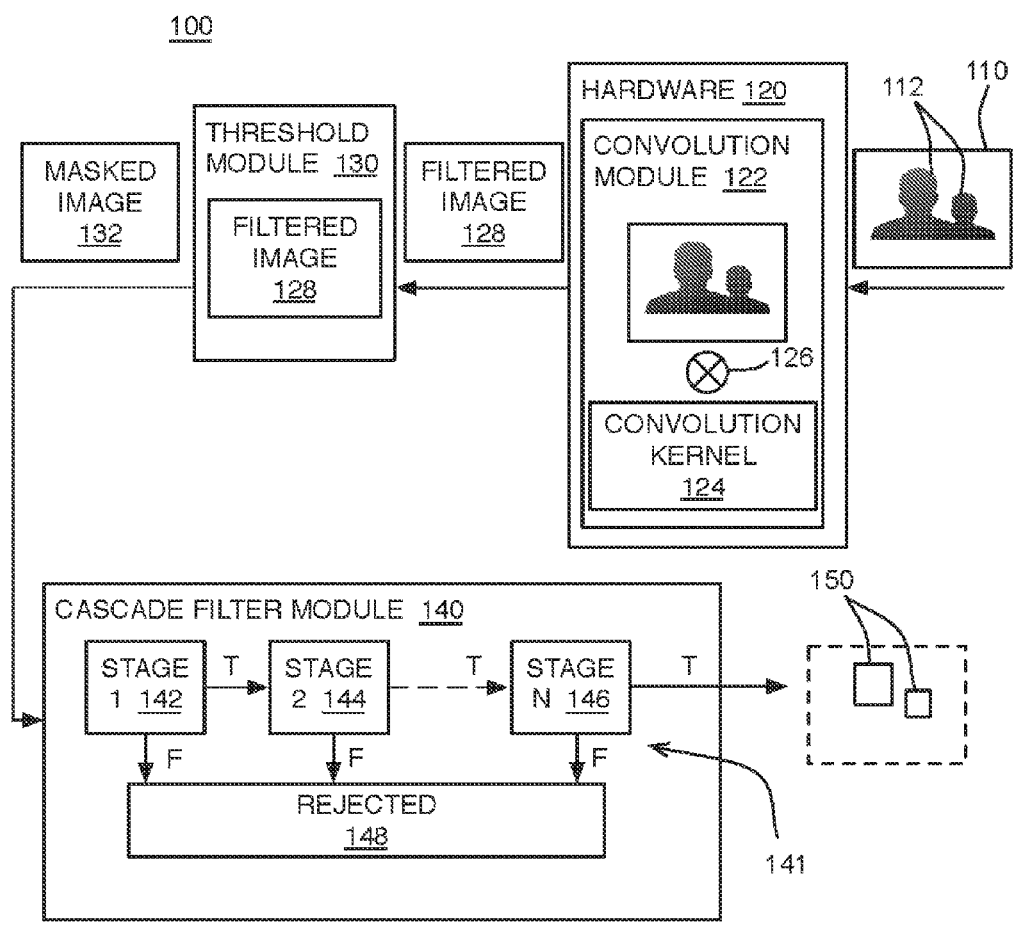
FIG. 1 is an illustrative diagram of an example object detection and/or recognition system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described related to a hardware-based convolution pre-filter to accelerate object detection.

As described above, object detection has a wide range of applications. However, current implementations of object detection are computationally intensive and have limitations such as not realizing real-time object detection and/or recognition, consuming a large portion or all of available computational resources, and being power intensive.

As described in greater detail below, a hardware-based convolution pre-filter may accelerate object detection and provide greater efficiency such that real-time object detection and/or object recognition may be attained and computational resources and power may be saved. For example, a convolution of an input image and a pre-trained convolution kernel may provide for a filtered image. A threshold may be applied to the filtered image to generate a masked image including masked and unmasked pixels. The masked pixels may be discarded as likely not containing the object of interest. For the unmasked pixels, which may have passed the convolution and threshold pre-filter, a cascade filter may be applied. The cascade filter may include several sequential stages. An individual unmasked pixel may go to the first stage and, if it passes the stage, continue to the second stage. If the pixel does not pass the stage, it may be discarded. In such a manner, passing pixels may be tested at sequential stages. Pixels that pass all the stages may be related to regions, object detection regions, that may be likely to contain an object or a portion of an object of interest. In general, an object detection region may be a region related to a passing pixel such that the process or system may have detected an object or a portion of an object in the region. In some examples, the region may be a number of pixels (e.g., 32 by 32 pixels) around the passing pixel, with the passing pixel being at the center of the region. The object detection regions may optionally be merged and passed along for further processing, such as object recognition processing.

In general, object detection as discussed herein may include detecting where, in an input image, an object (i.e., an object of a category of interest) may be in the input image. For example, in facial detection, detection may include detecting a face. Further, object recognition as discussed herein may include recognizing a particular object (i.e., an individual of the category of interest). For example, in facial recognition, recognition may include identifying which person is associated with a detected face. The described hardware-based convolution pre-filter may provide a fast, reliable, and low computing and power cost process for object detection and/or recognition implementations.

FIG. 1 is an illustrative diagram of an example system 100 for object detection and/or recognition, arranged in accordance with at least some implementations of the present disclosure. As shown, system 100 may include a convolution module 122 implemented via hardware 120, a threshold module 130, and a cascade filter module 140. In various implementations, system 100 may be configured to perform object detection, including performing object detection pre-filtering, and/or object recognition. As is discussed further below, system 100 may be employed via various hardware implementations with the commonality that convolution module 122 may be implemented via hardware 120. In general, hardware 120 may include hardware or a portion of hardware (e.g., a digital signal processor, a field programmable gate array, a graphics processing unit, or other hardware accelerator) dedicated to, or at least partially dedicated, to perform a convolution 126. In various implementations, threshold module 130 and/or cascade filter module 140 may be implemented via hardware 120 or other components of system 100, such as central processing unit(s) or graphics processing units, which are discussed further below, but are not shown in FIG. 1 for the sake of clarity.

As is discussed further below, system 100 may also include a merge module and/or an object recognition module, which are not shown in FIG. 1 for the sake of clarity. Further, in some examples, system 100 may include additional items that have not been shown in FIG. 1 for the sake of clarity. For example, system 100 may include a radio frequency-type (RF) transceiver, a display, an antenna, a speaker, a microphone, an accelerometer, memory, a router, network interface logic, etc.

In some examples, system 100 may perform object detection operations or object detection pre-filter operations. For example, system 100 may receive an input image 110, which may include one or more objects of interest 112. In general, input image 110 may be any suitable image or video data such as, for example, an image file or a video frame, or the like. Object of interest 112 may generally include any object for which object detection and/or recognition may be desired such as, for example, a face, an eye, a landmark, a written character, a human, or an automobile, or the like. In FIG. 1, facial detection and/or recognition is used as an illustrative example. As will be appreciated, in some examples, input image 110 may not include an object of interest.

As shown in FIG. 1, at convolution module 122 of hardware 120, convolution 126 of input image 110 and a convolution kernel 124 may be performed to generate a filtered image 128. In general, convolution 126 may provide a modified version (i.e., filtered image 128) of input image 110. For example, convolution 126 may provide an overlap between input image 110 and convolution kernel 124 as a function of the translation of input image 110. In some examples, convolution 126 of input image 110 may be performed on a pixel-by-pixel basis. Convolution kernel 124 may include any suitable kernel or template for generating filtered image 128 via convolution 126. For example, convolution kernel 124 may include a pre-designed convolution kernel or a pre-trained convolution kernel. A pre-trained convolution kernel may be generated by using a linear classifier trained by a large-scale training set. The training set may include a number of images containing the object and a number of images not containing the object, for example. As discussed above, convolution module 121 may be implemented via hardware 120. In various implementations, hardware 120 may include a digital signal processor, a field programmable gate array, a graphics processing unit, or other hardware accelerator, or the like.

As shown in FIG. 1, a threshold module 130 may apply a threshold to filtered image 128 to generate a masked image 132. In general, threshold module 130 may apply the threshold to filtered image in any suitable manner such as, for example, on a pixel-by-pixel basis. The applied threshold may include, for example, a pre-determined threshold, a pre-trained threshold, a convolution results pre-trained threshold, or the like. Masked image 132 may include a number of masked pixels and a number of unmasked pixels. In general, the masked pixels may be deemed to likely not include an object of interest or a portion of an object of interest while the unmasked pixels may be deemed to be likely to (or at least require further processing to determine whether they may) include an object of interest or a portion of an object of interest. In general, the masked pixels may be discarded. Such discarding of masked pixels (and, thereby, portions or areas of input image 110) may greatly reduce subsequent processing requirements since cascade filter module will not need to process the rejected or discarded pixels. Or, as will be appreciated, cascade filter module 140 may thereby only process those pixels (i.e., unmasked pixels) that are likely to be of interest and generate regions likely to have an object of interest or a portion of an object of interest.

The masked and unmasked pixels of masked image 132 may be represented in any suitable manner such as, for example, identifying masked pixels by a value of 1 and identifying unmasked pixels by a value of 0. Further, in some implementations, the size of the image may not have changed such that, for example, input image 110, filtered image 128, and masked image 132 may be the same size.

Cascade filter module 140 may apply a cascade filter 141 to individual pixel(s) of the unmasked pixels of masked image 132 to determine one or more object detection regions 150, as shown. In some examples, cascade filter 141 may be applied to all of the unmasked pixels of masked image 132. The object detection regions 150 may be related to one or more passing pixels (i.e., pixels that passed all stages of cascade filter 141). Object detection regions 150 may include regions in which an object has been detected, for example. In some examples, object detection regions 150 may be candidate regions for object recognition such that they may be termed object recognition candidate regions. In general, individual unmasked pixel(s) of masked image 132 may be processed through cascade filter 141 as implemented by cascade filter module 140. As shown, cascade filter 141 may include any number of stages, illustrated as stage 1 142, stage 2 144, and stage N 146. In an illustrative example, cascade filter 141 may be a seven stage cascade filter. At stages 142-146 of cascade filter 141, an unmasked pixel may be tested to determine whether it passes the stage. In general, the stage may include a true/false test. If a pixel passes the stage (e.g., the test with respect to the pixel is determined to be true), illustrated as "T" in FIG. 1, the pixel may be transferred to the next stage. If the pixel fails the stage (e.g., the test with respect to the pixel is determined to be false), illustrated as "F" in FIG. 1, the pixel may be rejected, discarded, and/or labeled as rejected 148.

In general, the test implemented at the various stages of the cascade filter may include a determination of whether pixels surrounding the pixel being tested may include the object of interest. An example of such a test may be illustrated as follows:

$$\sum_i f_{k,i}(x) > \theta_k \quad (1)$$

where k may be the current stage of cascade filter 141, i may be a pixel being tested, f may be test function, x may be a variable of interest, an θ may be a threshold. In some implementations, the test difficulty for a pixel may increase by stages such that earlier stages may be easier and less computationally intensive while later stages may be more difficult and more computationally intensive. Using such techniques, pixels may be discarded more efficiently, saving computing resources and power.

As discussed, cascade filter 141 may include any suitable type of cascade filter such as, for example, a Viola-Jones cascade filter or framework (see, e.g., Paul Viola, Michael Jones, Rapid Object Detection using a Boosted Cascade of Simple Features, CVPR 2001 and/or PCT/CN2010/000997, by Yangzhou Du, Qiang Li, entitled TECHNIQUES FOR FACE DETECTION AND TRACKING, filed Dec. 10, 2010). Such object detection techniques may allow object detection and/or recognition to include face detection, landmark detection, face alignment, smile/blink/gender/age detection, face recognition, detecting two or more faces, and/or the like. In some examples, cascade filter 141 may include a boosted cascade filter.

In other examples, the cascade filter may include a Speeded Up Robust Features (SURF) cascade filter or framework (see, e.g., Bay et al., "Surf: Speeded up robust features," Computer Vision and Image Understanding (CVIU), 110(3), pages 346-359, 2008 and/or PCT/CN2011/081642, by Jianguo Li, Yimin Zhang, entitled OBJECT DETECTION USING EXTENDED SURF FEATURES, filed Nov. 1, 2011). Such object detection techniques may also allow object detection and/or recognition to include face detection, landmark detection, face alignment, smile/blink/gender/age detection, face recognition, detecting two or more faces, and/or the like.

As discussed, the unmasked pixel(s) (if any) which passed the stages of cascade filter 141, may have a related object detection region 150. In general, object detection region 150 may be a region surrounding and including the unmasked passing pixel (e.g., the unmasked passing pixel may be at the center of the object detection region) which passed cascade filter 141. Object detection region 150 may have any size or shape such as, for example, a square shape having a size of 32 pixels by 32 pixels or 15 pixels by 15 pixels, or the like. In other examples, object detection region 150 may be rectangular or circular.

As discussed above and described further below, system 100 may include a merge module. A merge module may merge two or more object detection regions to form merged object detection regions. Such merging may consolidate regions for simplified processing such that merged region may contain more of (or possibly an entirety of) an object of interest.

Further, system 100 may also include an object recognition module. An object recognition module may perform object recognition on an object detection region, object detection regions, or merged detection region(s). Such object recognition may include identifying one or more objects of interest in those regions.

In some implementations, the resulting object detection region(s) from cascade filter module 140 or the optional merge module may be determined to include the object of interest and no further object detection processing may be performed. In some implementations, e resulting object detection region(s) from cascade filter module 140 may be further processed to determine whether the region(s) include an object of interest.

As will be discussed in greater detail below, system 100 or other systems discussed herein may be used to perform some or all of the various functions discussed below in connection with FIGS. 2-4, or the functions previously discussed with respect to FIG. 1.

Figure 2:
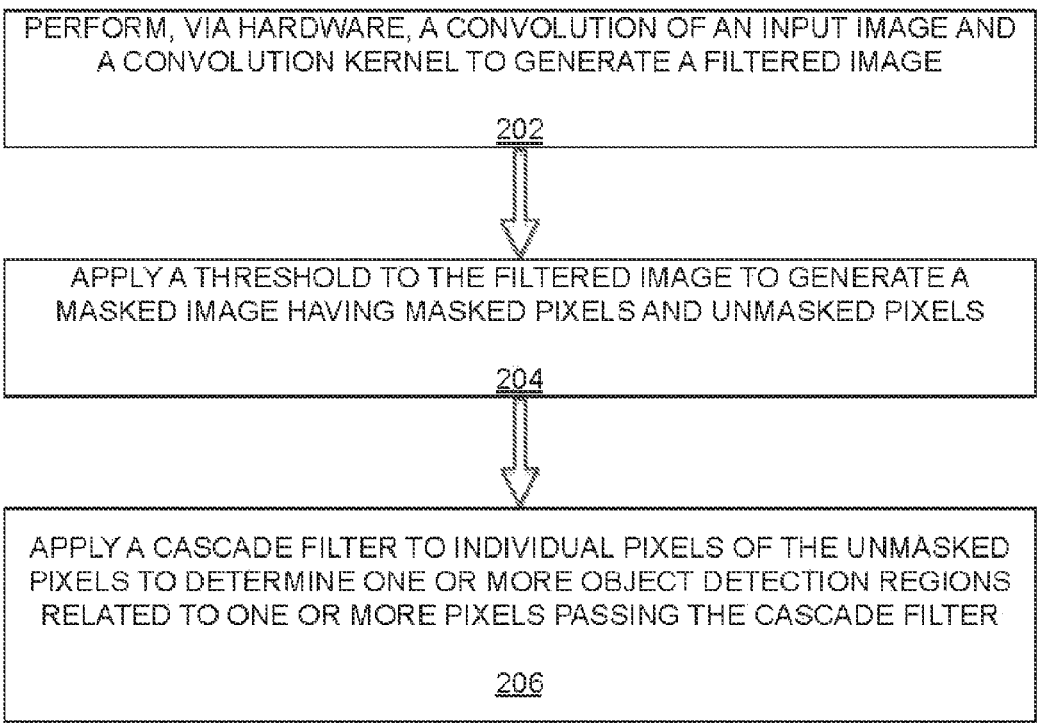
FIG. 2 is a flow chart illustrating an example object detection and/or recognition process.

FIG. 2 is a flow chart illustrating an example object detection and/or recognition process 200, arranged in accordance with at least some implementations of the present disclosure. In the illustrated implementation, process 200 may include one or more operations, functions or actions as illustrated by one or more of blocks 202, 204 and/or 206. By way of non-limiting example, process 200 will be described herein with reference to example system 100 of FIG. 1.

Process 200 may be utilized as a computer-implemented method for object detection and/or recognition. Process 200 may begin at block 202, "PERFORM, VIA HARDWARE, A CONVOLUTION OF AN INPUT IMAGE AND A CONVOLUTION KERNEL TO GENERATE A FILTERED IMAGE", where a filtered image may be generated by performing, via hardware, a convolution of an input image and a convolution kernel. For example, the filtered image may be generated by a convolution of an input image and a pre-trained convolution kernel via hardware or a portion of hardware (e.g., a digital signal processor, a field programmable gate array, a graphics processing unit, or other hardware accelerator) dedicated to, or at least partially dedicated, to perform the convolution.

Processing may continue from operation 202 to operation 204, "APPLY A THRESHOLD TO THE FILTERED IMAGE TO GENERATE A MASKED IMAGE HAVING MASKED PIXELS AND UNMASKED PIXELS", where a masked image may be generated by applying a threshold to the filtered image. For example, the masked image may include a number of masked pixels (e.g., those pixels deemed to likely not include an object of interest or a portion of an object of interest) and a number of unmasked pixels (e.g., those more likely to include an object of interest or a portion of an object of interest).

Processing may continue from operation 204 to operation 206, "APPLY A CASCADE FILTER TO INDIVIDUAL PIXELS OF THE UNMASKED PIXELS TO DETERMINE ONE OR MORE OBJECT DETECTION REGIONS RELATED TO ONE OR MORE PIXELS PASSING THE CASCADE FILTER", where a cascade filter may be applied to individual pixels of the unmasked pixels to determine one or more (if any) object detection regions related to one or more (if any) pixels passing the cascade filter. For example, the cascade filter may be a multi-stage cascade filter.

The resulting object detection regions (if any) may be optionally merged. They may also be further processed by performing object recognition on the regions to identify an object of interest or a potion of an object of interest in the regions.

Some additional and/or alternative details related to process 200 may be illustrated in one or more examples of implementations discussed in greater detail below with regard to FIGS. 3 and/or 4.

Figure 3:
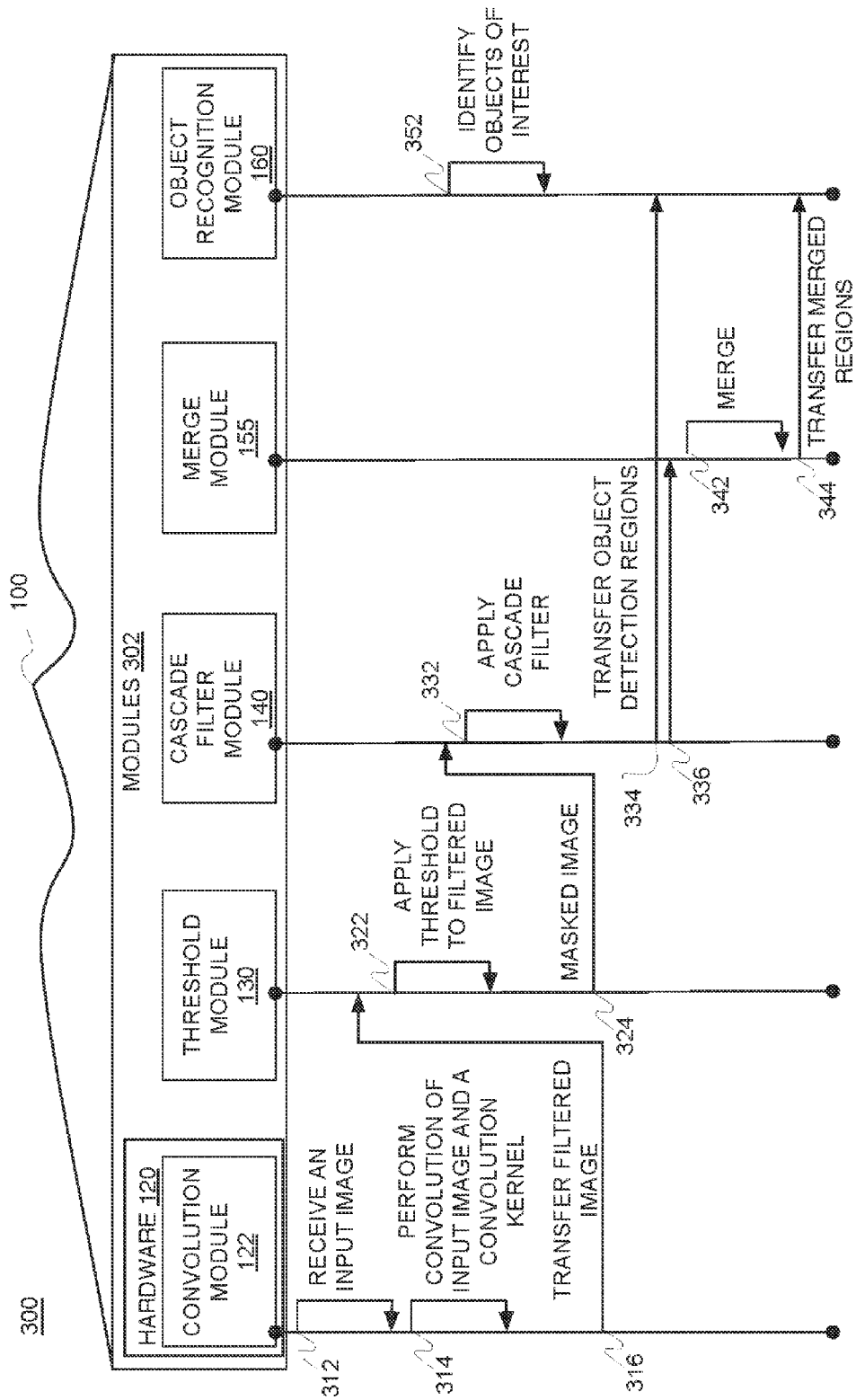
FIG. 3 is an illustrative diagram of an example object detection and/or recognition process in operation.

FIG. 3 is an illustrative diagram of example system 100 and process 300 for object detection and/or recognition in operation, arranged in accordance with at least some implementations of the present disclosure. In the illustrated implementation, process 300 may include one or more operations, functions or actions as illustrated by one or more of actions 312, 314, 316, 322, 324, 332, 334, 336, 342, 344, and/or 352. By way of non-limiting example, process 300 will be described herein with reference to example system 100 of FIG. 1.

In the illustrated implementation, system 100 may include modules 302, the like, and/or combinations thereof. For example, modules 306, may include convolution module 122, threshold module 130, cascade filter module 140, merge module 155, object recognition module 160, or the like, and/or combinations thereof. Convolution module 122 may be implemented in hardware 120 and may be configured to perform a convolution of an input image and a convolution kernel to generate a filtered image. Threshold module 130 may be configured to apply a threshold to the filtered image to generate a masked image having a plurality of masked pixels and a plurality of unmasked pixels. Cascade filter module 140 may be configured to perform, for individual pixels of the plurality of unmasked pixels, a cascade filter to determine one or more object detection regions related to one or more pixels passing the cascade filter. Merge module 155 may be configured to merge a two or more object detection regions to form a merged object detection region. Object recognition module 160 may be configured to perform object recognition on object detection regions and/or merged object detection regions. As discussed, convolution module 122 may be implemented via hardware 120. Threshold module 130, cascade filter module 140, merge module 155, and object recognition module 160 may be implemented in various implementations as is discussed further herein and, in particular, with respect to FIGS. 5 and 6.

Process 300 may be utilized as a computer-implemented method for object detection and/or recognition. Process 300 may begin at block 312, "RECEIVE AN INPUT IMAGE", where an input image may be received. For example, an input image may be received at convolution module 122. The input image may be received by any suitable techniques and may be received by system 100 from another device or may be generated internally at system 100 and transferred from another module of system 100 to convolution module 122.

Processing may continue from operation 312 to operation 314, "PERFORM CONVOLUTION OF INPUT IMAGE AND A CONVOLUTION KERNEL", where a convolution of the input image and a convolution kernel may be performed by convolution module 122 to generate a filtered image. For example, the convolution may be performed based on a pre-trained convolution kernel. For example, the convolution module may be maintained in memory and may be updated or trained over time.

Processing may continue from operation 314 to operation 316, "TRANSFER FILTERED IMAGE", where the filtered image may be transferred from convolution module 122 to threshold module 130.

Processing may continue from operation 316 to operation 322, "APPLY THRESHOLD TO FILTERED IMAGE", where a threshold may be applied by threshold module 130 to the filtered image to form a masked image. For example, the masked image may include unmasked pixels, which may be of interest for further processing, and masked pixels, which may be disregarded for further processing.

Processing may continue from operation 322 to operation 324, "TRANSFER MASKED IMAGE", where the masked image may be transferred from threshold module 130 to cascade filter module 140.

Processing may continue from operation 324 to operation 332, "APPLY CASCADE FILTER", where a cascade filter may be applied by cascade filter module 140 to the unmasked pixels of the masked image. For example, a multi-stage cascade filter may be applied to the unmasked pixels to determine passing pixels (i.e., pixels which passed all stages of the cascade filter). A passing pixel may be related to an object detection region which may be region surrounding and including the passing pixel, for example. Pixels which do not pass any stage of the cascade filter may be rejected and/or discarded.

Processing may continue from operation 332 to operation 334 or 336, both labeled "TRANSFER OBJECT DETECTION REGIONS", where one or more object detection regions may be transferred to merge module 155 and/or object recognition module 160. As discussed, in some examples, any determined object detection regions may be merged. In other examples, any determined object detection regions may be passed directly to object recognition module 160.

Processing may continue from operation 336 to operation 342, "MERGE", where any received object detection regions may be merged by merge module 155 to form one or more merged object detection regions.

Processing may continue from operation 342 to operation 344, "TRANSFER MERGED REGIONS", where any formed merged object detection regions may be transferred from merge module 155 to object recognition module 160.

Processing may continue from operation 334 or operation 344 to operation 352, "IDENTIFY OBJECTS OF INTEREST", where object recognition module 160 may perform object recognition on received object detection regions and/or received merged object detection regions. Object recognition module 160 may identify any objects which may include, for example, a face, an eye, a landmark, a written character, a human, or an automobile, or the like.

Figure 4:
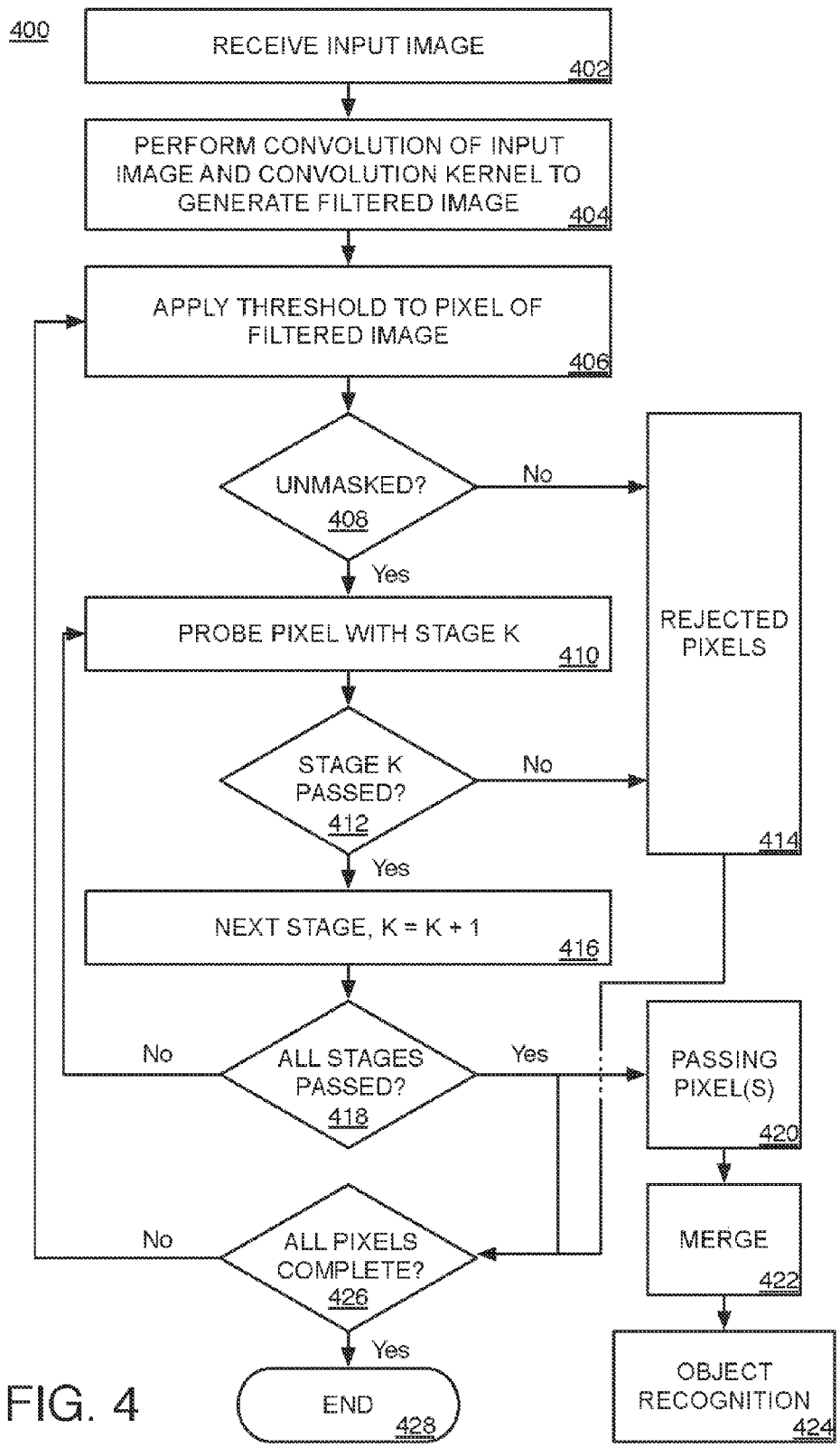
FIG. 4 is a flow chart illustrating a further example object detection and/or recognition process.

FIG. 4 is a flow chart illustrating an example object detection and/or recognition process 400, arranged in accordance with at least some implementations of the present disclosure. In the illustrated implementation, process 400 may include one or more operations, functions or actions as illustrated by one or more of blocks 402, 404, 406, 408, 410, 412, 414, 416, 418, 420, 422, 424, 426, and/or 428. By way of non-limiting example, process 400 will be described herein with reference to example system 100.

Process 400 may be utilized as a computer-implemented method for object recognition. Process 400 may begin at block 402, "RECEIVE INPUT IMAGE", where an input image may be received. For example, an image file or a video frame or the like may be received for processing.

Processing may continue from operation 402 to operation 404, "PERFORM CONVOLUTION OF INPUT IMAGE AND CONVOLUTION KERNEL TO GENERATE FILTERED IMAGE", where a convolution of the input image and a convolution kernel may be performed via hardware as discussed herein to generate a filtered image. Operation 404 may be performed at convolution module 122, for example.

Processing may continue from operation 404 to operation 406, "APPLY THRESHOLD TO PIXEL OF FILTERED IMAGE", where a threshold may be applied to a pixel of the filtered image. The threshold may include, for example, a pre-determined threshold, a pre-trained threshold, a convolution results pre-trained threshold, or the like. The threshold may be applied to a pixel of the filtered image to determine whether the pixel is a masked or unmasked pixel. Operation 406 may be performed at threshold module 130, for example.

Processing may continue from operation 406 to operation 408, "UNMASKED?", where it may be determined whether the pixel is masked or unmasked based on the application of the threshold. If the pixel is determined to be masked (i.e., it is deemed unlikely the pixel includes an object of interest or a portion of an object of interest), processing may continue from operation 408 to operation 414, "REJECTED PIXELS", where the pixel may be rejected.

If the pixel is determined to be unmasked, processing may continue from operation 408 to operation 410, "PROBE PIXEL WITH STAGE K", where the pixel may be probed or tested by a stage of a cascade filter. As will be appreciated, an unmasked pixel may be deemed to have passed a convolution and threshold pre-filter and may warrant further processing. In general, the pixel (and/or a region surrounding the pixel) may be deemed as likely (at this stage of processing) to include an object of interest or a portion of an object of interest. The pixel may be probed or tested at the current stage of the cascade filter using any of the techniques discussed herein, for example.

Processing may continue from operation 410 to operation 412, "STAGE K PASSED?", where it may be determined whether the pixel passes stage K of a cascade filter. Operations 410 and 412 may be performed by cascade filter module 140, for example. If the pixel failed stage K, processing may continue from operation 412 to operation 414, "REJECTED PIXELS", where the pixel may be rejected as unlikely to contain the object of interest or a portion of the object of interest. Processing may continue from operation 414 to operation 426, as is discussed further below.

If the pixel passed stage K, processing may continue from operation 412 to operation 416, "NEXT STAGE, K=K+1", where the cascade filter stage count may be increased to the next stage number (or a number higher than the last stage indicating all the stages may be complete). As discussed herein, a cascade filter may contain any suitable number of stages. As will be appreciated, the first time through operation 410 the pixel may be tested at stage 1, the second time through at stage 2, and so on until the pixel passes all the stages or fails a stage and may be rejected.

Processing may continue from operation 416 to operation 418, "ALL STAGES PASSED?", where it may be determined whether all the stages of the cascade filter may have been passed by the pixel. If not, the pixel may be processed by one or more additional stages of the cascade filter and processing may continue from operation 418 to operation 410, "PROBE PIXEL WITH STAGE K", as discussed above.

If the pixel has passed all the stages of the cascade filter, processing may continue from operation 418 to operation 420, "PASSING PIXEL(S)", where the pixel may stored as a passing pixel. As discussed herein, a passing pixel may be related to a object detection region, which may include and surround the passing pixel.

Processing may also continue from operation 420 to operation 422, "MERGE", where passing pixels and/or object detection regions related to the passing pixels may be merged to form, for example, merged object detection region(s). Depending on the configurations of the object detection regions, they may be merged into a single merged object detection region or multiple object detection regions. The merge operation may be performed by merge module 155, for example. In some examples, the merge operation may be performed after all of the pixels have been evaluated (i.e., either rejected or passed).

Processing may also continue from operation 422 to operation 424, "OBJECT RECOGNITION", where object recognition may be performed on object detection regions or merged object detection regions. As discussed, object recognition processing may include identifying objects in the regions. The object recognition operation may be performed by object recognition module 160, for example.

Further, if the pixel passed all the stages, processing may continue from operation 418 to operation 426, "ALL PIXELS COMPLETE?". As discussed, processing may also continue at operation 426 from operation 414. At operation 426, it may be determined whether all of the unmasked pixels have been evaluated by the process. If more pixels require processing, processing may continue from operation 426 to operation 406, "APPLY THRESHOLD TO PIXEL OF FILTERED IMAGE", as discussed above. If all the pixels are complete, processing may continue from operation 426 to operation 428, "END", where the process may end.

In operation, processes 200, 300, 400 and the operations discussed with respect to FIG. 1 may provide for object recognition and/or a pre-filter for object recognition. The pre-filter may include, for example, a convolution of an input image and a convolution kernel to form a filtered image, and applying a threshold to the filtered image. The pre-filter may also include a cascade filter. The pre-filter may accelerate object detection, such as facial detection. In general, the pre-filter may be considered a region filter or a pixel filter such that regions or pixels of a received input image may be rejected and subsequent processing may be avoided on those regions or pixels. Subsequent processing may instead focus on target regions (i.e., those regions likely to include the object or face being sought). Such techniques may allow for real-time object or face detection, particularly as resolutions increase to Full High Definition (1920×1080) and Ultra High Definition (3840×2160).

Using facial recognition as an illustrative example, hardware supporting 15×15 convolutions and using a face template of 32×32, a convolution kernel of 30×15 may be used. Such a convolution kernel may require the use of two neighborhood 15×15 convolutions, for example. As will be appreciated, the noted sizes are for example purposes only and, in particular, future hardware may support larger convolutions such as, for example 31×31 convolutions. A convolution kernel may be trained from a data set such as, for example, a data set with 16,000 cropped faces and 300,000 cropped non-faces using a linear classifier (e.g., a support vector machine, a logistic regression, or the like). Further, a cascade filter may be trained with results from a pre-filter combining convolution results and a threshold to form a masked image, as discussed above.

Such an implementation may be compared to an implementation having a cascade filter only. Such a cascade filter may be trained with, for example, 16,000 cropped faces and 19,000 cropped non-faces. As will be appreciated, such a pre-trained cascade filter (pre-trained with cropped and non-cropped faces) will be different from the cascade filter trained with results from a pre-filter combining convolution results and a threshold to form a masked image, as discussed immediately above (i.e., a convolution pre-trained cascade filter), based on their differing trainings.

To compare the two implementations, the false-positive-rate per window (FPPW) is evaluated. The following table illustrates the results:

TABLE 1

|  | Convolution and Threshold Pre-Filter + Cascade Filter | Cascade Filter |
| --- | --- | --- |
| Number of Stages | 1 Convolution and Threshold Pre-Filter + 7 Cascade Filter Stages | 8 Cascade Filter Stages |
| Template Size | 32 × 32 | 32 × 32 |
| Convolution Kernel Size | 30 × 15 (two 15 × 15 s) | Not Applicable |
| Pre-Filter Filter Rate | 86.4% at 99.9% True Positive Rate (TPR) | Not Applicable |
| Overall TPR | 94.05% | 91.29% |
| Test False Positive Rate (FPPW) | 3.62e−7 | 4.27e−7 |
| Number of Weak Classifiers | 204 | 251 |
| Theoretical Acceleration | >5.0x | 1.0x |

The results in Table 1 illustrate implementations using a Speeded Up Robust Features (SURF) cascade filter as discussed above. Similar results may be expected for other cascade filters such as, for example, Viola-Jones based cascade filters, or the like.

The shown theoretical acceleration shown in Table 1 may be determined as follows. A hardware convolution of size 15×15 may run at 0.5 pixel/clock if the template is of the uint8 (elements of an array converted into unsigned 8-bit integers) type or at 0.125 pixel/clock if the template is of the int16 (elements of an array converted into 16-bit integers) type. An unsigned 8-bit type may be assumed, meaning one convolution at one pixel may require 2 clocks. The convolution and threshold pre-filter may require 2 convolutions and 1 threshold operation, meaning an individual pixel position may require 5 clocks. In comparison, a single instruction, multiple data (SIMD) implementation of a first stage of a cascade filter may require more than 25 clocks at 256 bits.

The convolution and threshold pre-filter may filter more than 86% of the pixels in an image (see Table 1). In comparison, a first stage of a cascade filter may filter only 75% of the pixels in an image. Therefore, the convolution and threshold pre-filter technique may be 5× much faster (requiring 5 clocks instead of 25 clocks), or more, and more effective. Further, the convolution and threshold pre-filter technique along with the 7 stage cascade filter may have fewer weak classifiers than a standard 8 stage cascade filter (204 v. 251, see Table 1).

As discussed, the convolution and threshold pre-filter techniques along with cascade filter techniques discussed herein may have many advantages in object detection implementations. First, as just described, the techniques may provide acceleration (up to 5× or more). Further, as discussed, the convolution module may be implemented in hardware (as may other modules), which may provide less power consumption. Such advantages may be especially important in battery operated and/or mobile devices. Also, the implementations discussed may leave valuable computing resources (e.g., at the central processing unit(s) and/or graphics processing unit(s)) available for other simultaneous computing requirements such as, for example, video decoding, Open Graphics Library (OpenGL) rendering, or the like.

While implementation of example processes 200, 300, 400, and processes discussed with respect to FIG. 1 may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 1-4, and processes discussed with respect to FIG. 1, may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 1-4

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 5:
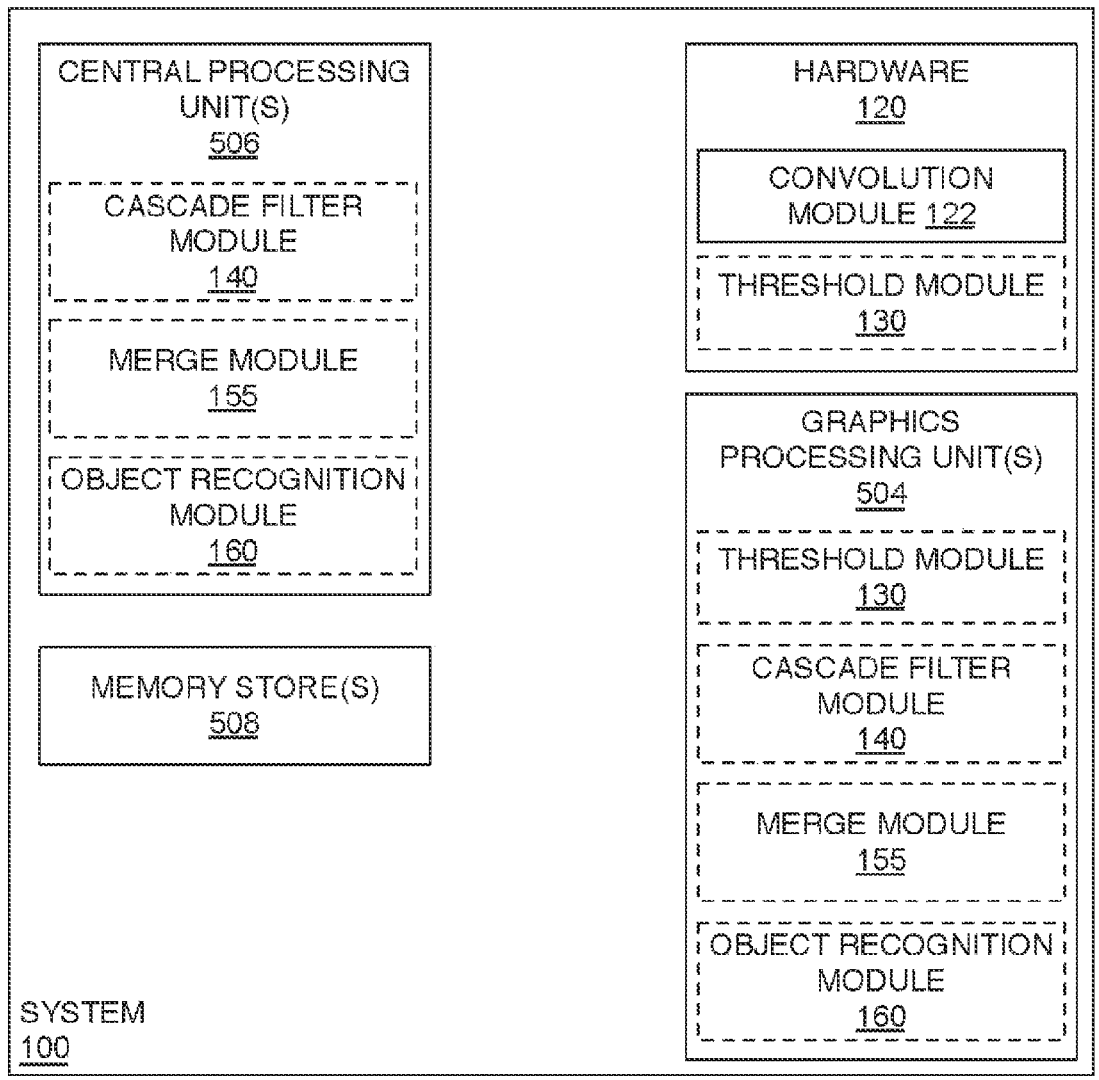
FIG. 5 is an illustrative diagram of an example object detection and/or recognition system.

FIG. 5 is an illustrative diagram of an example system 100 for object detection and/or recognition, arranged in accordance with at least some implementations of the present disclosure. In the illustrated implementation, system 100 may include one or more central processing units 506, one or more memory stores 508, hardware 120, and/or one or more graphics processing units 504. Central processing units 506, memory store 508, hardware 120, and graphics processing units 504 may be capable of communication with one another, via, for example, a bus or other access.

As shown in FIG. 5 and discussed above, convolution module 122 may be implemented via hardware 120. Further, in various examples, cascade filter module 140 may be implemented via hardware 122, central processing units 506 or graphics processing units 504. Also, in various examples, merge module 155 may be implemented via central processing units 506 or graphics processing units 504. Similarly, in various examples, object recognition module 160 may be implemented via central processing units 506 or graphics processing units 504.

As discussed, hardware 120 may include, for example, a digital signal processor or a field programmable gate array or other suitable hardware accelerator. Hardware 120 may be a hardware module implementing convolution module 122 via dedicated hardware (i.e. a portion of hardware 120 dedicated to a convolution function, which may implement the convolution of an input image and a convolution kernel as discussed herein). In various embodiments, the implementations of threshold module 130, cascade filter module 140, merge module 155, and/or object recognition module 160 may be include hardware implementations and/or software implementations. For example, modules implemented via central processing units 506 may be implemented via software. Modules implemented via graphics processing units 504 may be implemented via hardware (if available) or via software (if applicable), for example.

Central processing units 506 may include any suitable implementation including, for example, microprocessor(s), multicore processors, application specific integrated circuits, chip(s), chipsets, or the like. Further, graphics processing units 504 may include any suitable implementation including, for example, processor(s), multicore processors, application specific integrated circuits, programmable logic devices, graphics cards, integrated graphics, general purpose graphics processing unit(s), or the like. In addition, memory stores 508 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 508 may be implemented by cache memory. In various examples, system 100 may be implemented as a chipset or as a system on a chip.

Figure 6:
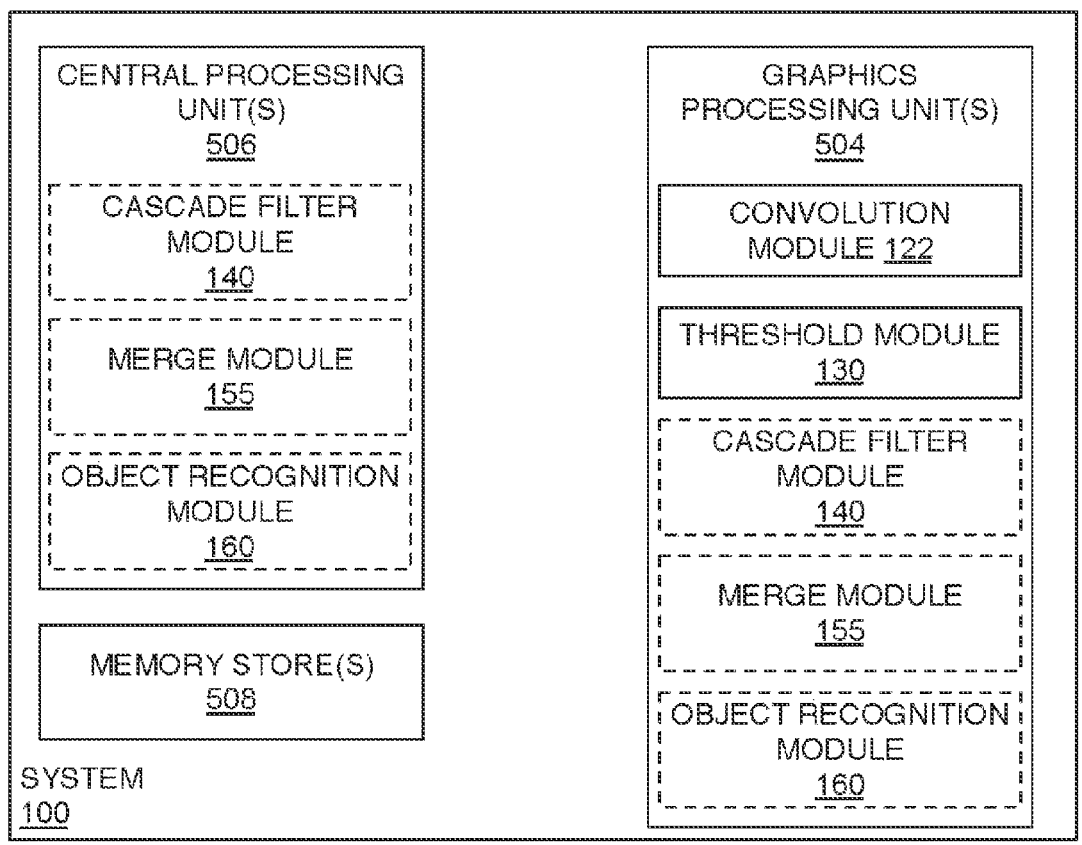
FIG. 6 is an illustrative diagram of a further example object detection and/or recognition system.

FIG. 6 is an illustrative diagram of a further example system 100 for object detection and/or recognition, arranged in accordance with at least some implementations of the present disclosure. In the illustrated implementation, system 100 may include one or more central processing units 506, one or more memory stores 508, and/or one or more graphics processing units 504. Central processing units 506, memory store 508, and graphics processing units 504 may be capable of communication with one another, via, for example, a bus or other access.

As will be appreciated, the implementation of FIG. 6 is similar to the implementation of FIG. 5 with the exception that convolution module 122 may be implemented via graphics processing units 504, as shown. Graphics processing units 504 may implement convolution module 122 via dedicated hardware (i.e. a portion of graphics processing units 504 dedicated to a convolution function, which may implement the convolution of an input image and a convolution kernel as discussed herein). In general, convolution module 122 may be a hardware based implementation via graphics processing units 504. Further, in various examples, threshold module may be implemented via graphics processing units 504. Also, in various examples, cascade filter module 140 may be implemented via central processing units 506 or graphics processing units 504. In various examples, Merge module 155 may be implemented via central processing units 506 or graphics processing units 504. Similarly, in various examples, object recognition module 160 may be implemented via central processing units 506 or graphics processing units 504.

As discussed, in various embodiments, the implementations of threshold module 130, cascade filter module 140, merge module 155, and/or object recognition module 160 may be include hardware implementations and/or software implementations. For example, modules implemented via central processing units 506 may be implemented via software. Modules implemented via graphics processing units 504 may be implemented via hardware (if available) or via software (if applicable), for example. Also as discussed, central processing units 506 may include any suitable implementation including, for example, microprocessor(s), multicore processors, application specific integrated circuits, chip(s), chipsets, or the like. Further, graphics processing units 504 may include any suitable implementation including, for example, processor(s), multicore processors, application specific integrated circuits, programmable logic devices, graphics cards, integrated graphics, general purpose graphics processing unit(s), or the like. In addition, memory stores 508 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 508 may be implemented by cache memory. In various examples, system 100 may be implemented as a chipset or as a system on a chip.

Figure 7:
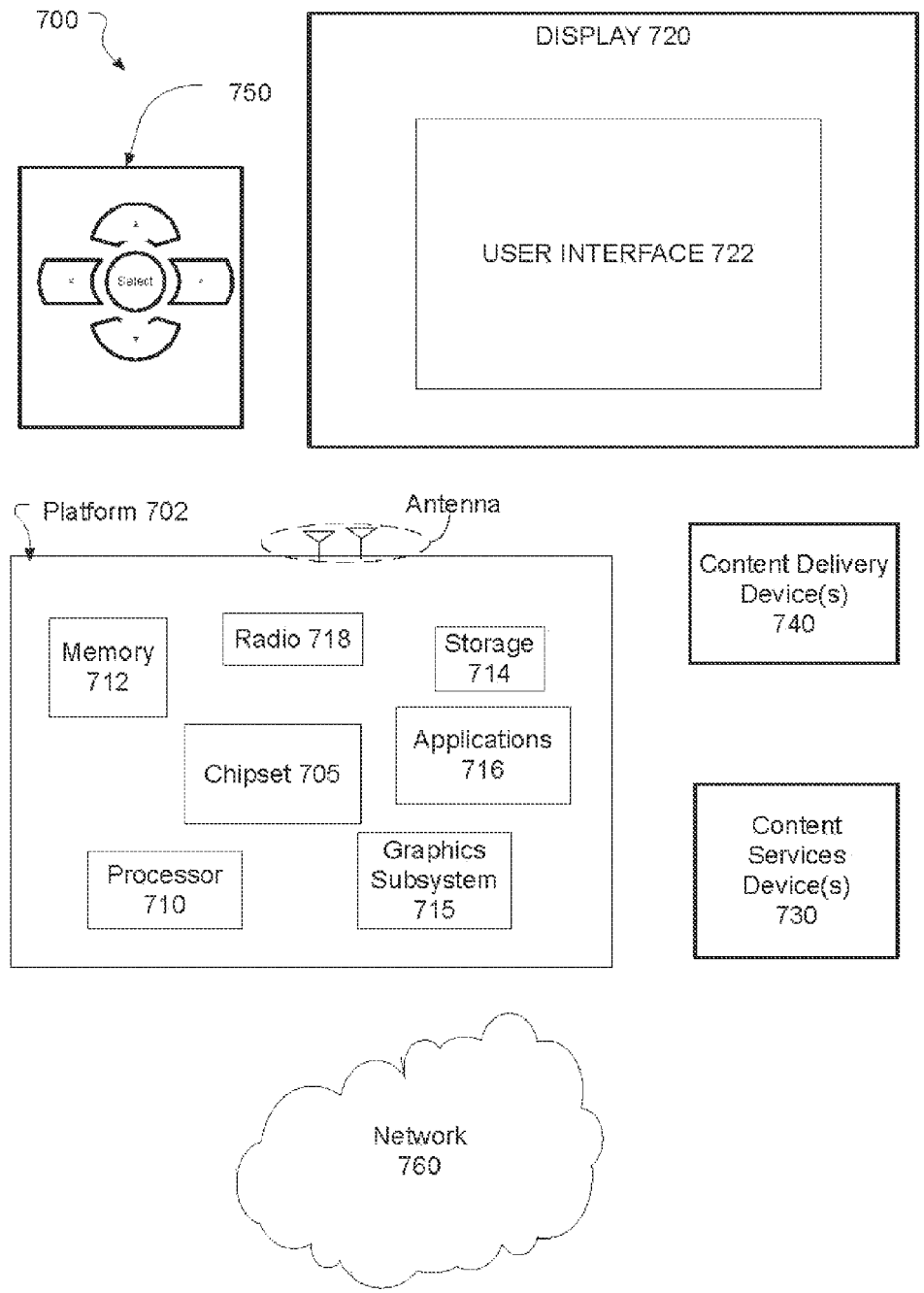
FIG. 7 is an illustrative diagram of an example system.

FIG. 7 illustrates an example system 700 in accordance with the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, Display Port, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
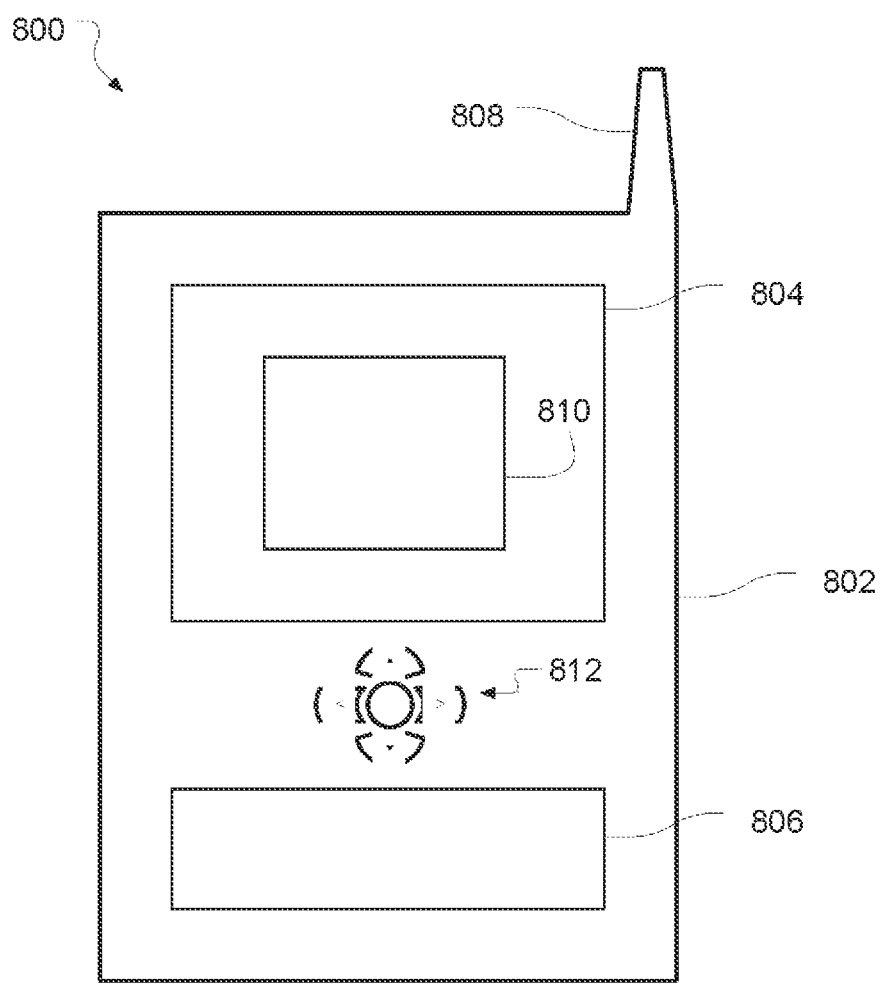
FIG. 8 is an illustrative diagram of an example system, all arranged in accordance with at least some implementations of the present disclosure.

As described above, system 700 may be embodied in varying physical styles or form factors. FIG. 8 illustrates implementations of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for object detection may include performing, via hardware, a convolution of an input image and a convolution kernel to generate a filtered image. A threshold may be applied to the filtered image to generate a masked image having masked pixels and unmasked pixels. A cascade filter may be applied to individual pixels of the unmasked pixels of the masked image to determine one or more object detection regions related to one or more pixels passing the cascade filter.

In one example, a computer-implemented method for object recognition may include performing, via hardware, a convolution of an input image and a convolution kernel to generate a filtered image. A threshold may be applied to the filtered image to generate a masked image having masked pixels and unmasked pixels. A cascade filter may be applied to individual pixels of the unmasked pixels of the masked image to determine one or more object detection regions related to one or more pixels passing the cascade filter. Further, the image may be received. Object recognition may be performed on the one or more object regions such that performing the object recognition may include identifying an object in an object region. The object may a face, an eye, a landmark, a written character, a human, or an automobile. Further, two or more object regions may be merged to form a merged object region. The input image may include an image file or a video frame. The hardware may include a digital signal processor, a graphics processing unit, or a field programmable gate array. The convolution kernel may include a designed convolution kernel or a pre-trained convolution kernel or a linear classifier trained by a large-scale training set, the large scale training set including images containing the object and images not containing the object. Applying the threshold to the filtered image may include applying a pre-trained threshold or applying a convolution results pre-trained threshold. Performing the convolution may include performing the convolution of the input image on a pixel-by-pixel basis. Applying the threshold to the filtered image may include applying the threshold to the filtered image on a pixel-by-pixel basis. The input image, the filtered image, and the masked image may be the same size. The masked pixels may be identified by a value of 1 and the unmasked pixels may be identified by a value of 0. Applying the cascade filter may include applying a seven-stage cascade filter. Applying the cascade filter may include determining, for a first stage of the cascade filter, whether a first unmasked pixel of the plurality of unmasked pixels passes the first stage and if the first unmasked pixel passes the first stage, transferring the first unmasked pixel to a second stage of the cascade filter or if the first unmasked pixel fails the first stage, rejecting the first unmasked pixel. An object detection region may be related to a passing pixel, the first object region may have a size of 32 pixels by 32 pixels, and the first passing pixel may be in the center of the first object region. The cascade filter may include a Viola-Jones cascade filter or a boosted cascade filter.

Further, applying the threshold to the filtered image may include applying the threshold to the filtered image via the digital signal processor, the graphics processing unit, or the field programmable gate array. Applying the cascade filter may include applying the cascade filter via the graphics processing unit or a central processing unit. Performing object recognition on the object detection regions may include performing object recognition on the object regions via the central processing unit. Merging the two or more object detection regions may include merging the two or more object detection regions via the central processing unit.

In other examples, a system for object recognition on a computer may include one or more processors, one or more memory stores, a hardware module, a threshold module, and a cascade filter module, and/or combinations thereof. The one or more processors may be communicatively coupled to the hardware module. The one or more memory stores may be communicatively coupled to the one or more processors. The hardware module may be configured to perform a convolution of an input image and a convolution kernel to generate a filtered image. The threshold module may be configured to apply a threshold to the filtered image to generate a masked image having masked pixels and unmasked pixels. The cascade filter module may be configured to perform, for individual pixels of the unmasked pixels, a cascade filter to determine object regions related to pixels passing the cascade filter.

In another example, the system for object recognition on a computer may further include a graphics processing unit, a merge module, and an object recognition module. The graphics processing unit may be communicatively coupled to the one or more processors. The merge module may be configured to merge two or more object regions to form a merged object region. The object recognition module may be configured to perform object recognition on the object regions or a merged object region.

In another example, the system may further include the object including a face, an eye, a landmark, a written character, a human, or an automobile. The input image may include an image file or a video frame. The hardware module may include a digital signal processor, a graphics processing unit, or a field programmable gate array. The convolution kernel may include a designed convolution kernel or a pre-trained convolution kernel or a linear classifier trained by a large-scale training set, the large scale training set including images containing the object and images not containing the object. The threshold module may be further configured to apply at least one of a pre-trained threshold or a convolution results pre-trained threshold. The hardware module may be further configured to perform the convolution of the input image on a pixel-by-pixel basis. The threshold module may be further configured to apply the threshold to the filtered image on a pixel-by-pixel basis. The input image, the filtered image, and the masked image may be a same size. The masked pixels may be identified by a value of 1 and the unmasked pixels are identified by a value of 0. The cascade filter module may include a seven-stage cascade filter. The cascade filter module may be further configured to perform the cascade filter by determining, for a first stage of the cascade filter, whether a first unmasked pixel passes the first stage and if the first unmasked pixel passes the first stage, transferring the first unmasked pixel to a second stage of the cascade filter or if the first unmasked pixel fails the first stage, rejecting the first unmasked pixel. An object region may be related to a passing pixel, the first object region may have a size of 32 pixels by 32 pixels, and the first passing pixel may be in the center of the first object region. The cascade filter may include a Viola-Jones cascade filter or a boosted cascade filter.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for object detection comprising:
   performing, via hardware, a convolution of an input image and a convolution kernel to generate a filtered image;
   applying a convolution kernel based threshold on a pixel-by-pixel basis to the filtered image to generate a masked image having a plurality of masked pixels and a plurality of unmasked pixels; and
   applying a cascade filter to individual pixels of the plurality of unmasked pixels of the masked image to determine one or more object detection regions related to one or more pixels passing the cascade filter.

2. The method of claim 1, further comprising:
performing object recognition on the one or more object detection regions, wherein performing the object recognition comprises identifying an object in a first object detection region.

3. The method of claim 1, further comprising:
receiving the input image;
merging a first object detection region and a second object detection region of the one or more object detection regions to form a merged object detection region; and
performing object recognition on the merged object detection region, wherein performing the object recognition comprises identifying an object in the merged object detection region.

4. The method of claim 1, wherein the hardware comprises at least one of a digital signal processor, a graphics processing unit, or a field programmable gate array.

5. The method of claim 1, wherein the cascade filter comprises at least one of a Viola-Jones cascade filter or a boosted cascade filter.

6. The method of claim 1, wherein applying the cascade filter comprises determining, for a first stage of the cascade filter, whether a first unmasked pixel of the plurality of unmasked pixels passes the first stage; and
if the first unmasked pixel passes the first stage, transferring the first unmasked pixel to a second stage of the cascade filter; or
if the first unmasked pixel fails the first stage, rejecting the first unmasked pixel.

7. The method of claim 1, wherein the convolution kernel comprises a pre-trained convolution kernel.

8. The method of claim 1, wherein applying the threshold to the filtered image comprises at least one of applying a pre-trained threshold or applying a convolution results pre-trained threshold.

9. The method of claim 1, wherein performing the convolution comprises performing the convolution of the input image on a pixel-by-pixel basis.

10. The method of claim 1, wherein the input image comprises at least one of an image file or a video frame.

11. A system for object detection on a computer comprising:
a graphics processor to perform a convolution of an input image and a convolution kernel to generate a filtered image and to apply a convolution kernel based threshold on a pixel-by-pixel basis to the filtered image to generate a masked image having a plurality of masked pixels and a plurality of unmasked pixels;
a processor communicatively coupled to the graphics processor; and
a memory communicatively coupled to the processor, wherein the processor is to apply, for individual pixels of the plurality of unmasked pixels, a cascade filter to determine one or more object detection regions related to one or more pixels passing the cascade filter.

12. The system of claim 11, wherein the processor is further to merge a first object detection region and a second object detection region of the one or more object detection regions to form a merged object detection region and to perform object recognition on the merged object detection region.

13. The system of claim 11, wherein the processor is further to perform object recognition on the one or more object detection regions.

14. The system of claim 11, wherein the convolution kernel comprises a pre-trained convolution kernel, and wherein the pre-trained convolution kernel comprises a linear classifier.

15. At least one non-transitory machine readable medium comprising a plurality of instructions that in response to being executed on a computing device, cause the computing device to perform object detection by:
performing, via hardware, a convolution of an input image and a convolution kernel to generate a filtered image;
applying a convolution kernel based threshold on a pixel-by-pixel basis to the filtered image to generate a masked image having a plurality of masked pixels and a plurality of unmasked pixels; and
applying a cascade filter to individual pixels of the plurality of unmasked pixels of the masked image to determine one or more object detection regions related to one or more pixels passing the cascade filter.

16. The machine readable medium of claim 15, further comprising instructions that in response to being executed on the computing device, cause the computing device to perform object detection by:
performing object recognition on the one or more object detection regions, wherein performing the object recognition comprises identifying an object in a first object detection region.

17. The machine readable medium of claim 15, wherein the cascade filter comprises at least one of a Viola-Jones cascade filter or a boosted cascade filter.

18. The machine readable medium of claim 15, wherein performing the convolution comprises performing the convolution of the input image on a pixel-by-pixel basis.

19. The machine readable medium of claim 15, further comprising instructions that in response to being executed on the computing device, cause the computing device to perform object detection by:
performing object recognition on the one or more object detection regions, wherein performing the object recognition comprises identifying an object in a first object detection region of the one or more object detection regions and wherein the object comprises at least one of a face, an eye, a landmark, a written character, a human, or an automobile.

* * * * *